(12) United States Patent
Yun et al.

(10) Patent No.: US 10,771,209 B2
(45) Date of Patent: Sep. 8, 2020

(54) METHOD FOR TRANSMITTING AND RECEIVING SIGNAL IN WIRELESS LAN SYSTEM AND APPARATUS THEREFOR

(71) Applicant: LG ELECTRONICS INC., Seoul (KR)

(72) Inventors: Sunwoong Yun, Seoul (KR); Jinmin Kim, Seoul (KR); Sungjin Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/322,284

(22) PCT Filed: Mar. 27, 2018

(86) PCT No.: PCT/KR2018/003575
§ 371 (c)(1),
(2) Date: Jan. 31, 2019

(87) PCT Pub. No.: WO2018/182271
PCT Pub. Date: Oct. 4, 2018

(65) Prior Publication Data
US 2019/0173636 A1 Jun. 6, 2019

Related U.S. Application Data

(60) Provisional application No. 62/478,046, filed on Mar. 29, 2017, provisional application No. 62/479,336, (Continued)

(51) Int. Cl.
*H04L 5/00* (2006.01)
*H04L 27/26* (2006.01)
(Continued)

(52) U.S. Cl.
CPC .............. *H04L 5/0039* (2013.01); *H04L 1/06* (2013.01); *H04L 5/0023* (2013.01); (Continued)

(58) Field of Classification Search
CPC .... H04L 1/06; H04L 27/2601; H04L 27/2675
See application file for complete search history.

(56) References Cited

U.S. PATENT DOCUMENTS

2008/0240285 A1* 10/2008 Han ...................... H04L 5/0007
375/295
2011/0085453 A1* 4/2011 Wu ....................... H04L 5/0007
370/252
(Continued)

FOREIGN PATENT DOCUMENTS

KR 20160129714 A * 11/2016 ........... H04L 5/0023
KR 20170020073 A * 2/2017 ............ H04W 52/02
(Continued)

OTHER PUBLICATIONS

PCT International Application No. PCT/KR2018/003575, International Search Report dated Jul. 17, 2018, 6 pages.
(Continued)

*Primary Examiner* — Mansour Oveissi
(74) *Attorney, Agent, or Firm* — Lee, Hong, Degerman, Kang & Waimey PC

(57) ABSTRACT

The present specification suggests a method for transmitting and receiving a signal, by a station, in a wireless LAN (WLAN) system supporting a maximum of eight space time streams, and an apparatus therefor. More specifically, the present specification suggests a method for transmitting and receiving a signal including a pilot sequence for 2 channel bonding per each space time stream when a station transmits and receives a signal through a channel in which two channels are bonded, and an apparatus therefor.

8 Claims, 12 Drawing Sheets

Related U.S. Application Data filed on Mar. 31, 2017, provisional application No. 62/486,027, filed on Apr. 17, 2017.

(51) Int. Cl.
  *H04L 1/06* (2006.01)
  *H04W 84/12* (2009.01)
(52) U.S. Cl.
  CPC ............ *H04L 5/0048* (2013.01); *H04L 27/26* (2013.01); *H04L 27/2613* (2013.01); *H04W 84/12* (2013.01)

(56) References Cited

U.S. PATENT DOCUMENTS

| | | | |
|---|---|---|---|
| 2012/0224659 A1* | 9/2012 | Yu | H04L 5/0048 375/340 |
| 2015/0146653 A1 | 5/2015 | Zhang et al. | |
| 2016/0261319 A1 | 9/2016 | Sanderovich | |
| 2016/0301451 A1 | 10/2016 | Seok | |
| 2016/0302200 A1 | 10/2016 | Yang et al. | |
| 2018/0062902 A1* | 3/2018 | Gagiev | H04L 27/2605 |

FOREIGN PATENT DOCUMENTS

| | | | | |
|---|---|---|---|---|
| KR | 20170030608 A | * | 3/2017 | ......... H04B 7/15542 |
| WO | 2016170505 | | 10/2016 | |

OTHER PUBLICATIONS

European Patent Office Application Serial No. 187760475, Search Report dated Mar. 5, 2020, 6 pages.
Korean Intellectual Property Office Application No. 10-2019-7001717, Notice of Allowance dated May 1, 2020, 6 pages.
Samsung Electronics, "Length 1344 LDPC codes for 11ay", IEEE 802.11-16/0676r1, May 17, 2016, XP068119570, 32 pages.
Intel, "IEEE P802.11 Wireless LANs: 30.6.1.5 Pilot Sequences", IEEE 802.11-yy/xxxxr0, May 1, 2017, XP055663456, 3 pages.
LG Electronics, "IEEE P802.11 Wireless LANs: 30.6.1.5 OFDMM Pilot Sequences", IEEE 802.11-17/0712r0, May 10, 2017, XP068115940, 4 pages.
LG Electronics, "OFDM Pilot Sequences in 11ay", IEEE 802.11-17/0661r0, May 10, 2017, 15 pages.
LG Electronics, "IEEE P802.11 Wireless LANs: 30.6.1.5 OFDM Pilot Sequences", IEEE 802.11-17/0712r0, May 10, 2017, 3 pages.

* cited by examiner

FIG. 9

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: Legacy, GF: Gap Filling, ay: 802.11ay)

METHOD FOR TRANSMITTING AND RECEIVING SIGNAL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/003575, filed on Mar. 27, 2018, which claims the benefit of U.S. Provisional Application No. 62/478,046, filed on Mar. 29, 2017, 62/479,336, filed on Mar. 31, 2017, and 62/486,027, filed on Apr. 17, 2017, the contents of which are all hereby incorporated by reference herein in their entireties.

BACKGROUND OF THE INVENTION

Field of the Invention

The following description relates to a method for transmitting and receiving a signal of a station in a wireless local area network (WLAN) system supporting up to 8 space-time streams, and more particularly, to a method for transmitting and receiving a signal including a pilot sequence for two-channel bonding (2 CB) for each space-time stream in case where the station transmits and receives a signal through two bonded channels, and an apparatus therefor.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

A hay system to which the present invention is applicable may support signal transmission/reception through up to 8 space-time streams and two bonded channels.

Here, the present invention proposes a method for configuring a pilot sequence for two bonded channels for each space-time stream and transmitting and receiving a signal including the configured pilot sequence, in case where a station transmits and receives a signal through the two bonded channels, and an apparatus therefor.

In an aspect, a method for transmitting, by a first station, a signal through two bonded channels to a second station in a wireless LAN (WLAN) system supporting up to 8 space-time streams includes: generating a 36-length pilot sequence for two-channel bonding for each space-time stream using/based on 12-length sequences for the each space-time stream, wherein the 12-length sequences are mutually orthogonal; and transmitting a signal including the 36-length pilot sequence for each space-time stream through the two bonded channels.

In another aspect, a method for receiving, by a first station, a signal through two bonded channels from a second station in a wireless LAN (WLAN) system supporting up to 8 space-time streams includes: receiving a signal including a 36-length pilot sequence for each space-time stream through the two bonded channels, wherein the 36-length pilot sequence for two-channel bonding for each space-time stream is generated using/based on 12-length sequences for the each space-time stream, wherein the 12-length sequences are mutually orthogonal; and decoding the received signal using/based on the received 36-length pilot sequence for each space-time stream.

In another aspect, a station device for transmitting a signal through two bonded channels in a wireless LAN (WLAN) system supporting up to 8 space-time streams includes: a transceiver unit having at least one radio frequency (RF) chain and configured to transmit and receive a signal to and from another station device; and a processor connected to the transceiver unit and processing the signal transmitted to or received from the other station device, wherein the processor generates a 36-length pilot sequence for two-channel bonding for each space-time stream using/based on 12-length sequences for the each space-time stream, wherein the 12-length sequences are mutually orthogonal; and transmits a signal including the 36-length pilot sequence for each space-time stream through the two bonded channels.

In another aspect, a station device for receiving a signal through two bonded channels in a wireless LAN (WLAN) system supporting up to 8 space-time streams includes: a transceiver unit having at least one radio frequency (RF) chain and configured to transmit and receive a signal to and from another station device; and a processor connected to the transceiver unit and processing the signal transmitted to or received from the other station device, wherein the processor is configured to receive a signal including a 36-length pilot sequence for each space-time stream through the two bonded channels, the 36-length pilot sequence for two-channel bonding for each space-time stream is generated using/based on 12-length sequences for the each space-time stream, wherein the 12-length sequences are mutually orthogonal, and the processor is configured to decode the received signal using/based on the received 36-length pilot sequence for each space-time stream.

In the configurations, the signal may be transmitted through up to 8 space-time streams.

Also, in the configurations, the 36-length pilot sequence for each space-time stream may be configured by repeating a 12-length sequence for each space-time stream three times.

For example, the 12-length sequence for each space-time stream may be set as shown in Table below.

TABLE

| $i_{STS}$ | $P_{12}(i_{STS}, :)$ |
|---|---|
| 1 | [−1 +1 −1 +1 +1 −1 −1 −1 −1 −1 +1 +1] |
| 2 | [+1 −1 +1 +1 −1 −1 −1 −1 −1 +1 +1 −1] |

TABLE-continued

| $i_{STS}$ | $P_{12}(i_{STS}, :)$ |
|---|---|
| 3 | [−1 +1 +1 −1 −1 −1 −1 −1 +1 +1 −1 +1] |
| 4 | [+1 +1 −1 −1 −1 −1 +1 +1 −1 +1 −1 −1] |
| 5 | [+1 −1 −1 −1 +1 −1 −1 +1 −1 +1 −1 +1] |
| 6 | [−1 −1 +1 −1 −1 −1 +1 +1 −1 −1 +1 +1] |
| 7 | [−1 −1 −1 +1 −1 +1 −1 +1 +1 +1 +1 +1] |
| 8 | [−1 −1 −1 −1 +1 −1 +1 −1 +1 +1 +1 −1] |

Here, $P_{12}(i_{STS},:)$ denotes/is a 12-length pilot sequence for each space-time stream and $i_{STS}$ denotes/is a space-time stream index.

The effects of the present invention will not be limited only to the effects described above. Accordingly, effects that have not been mentioned above or additional effects of the present application may become apparent to those having ordinary skill in the art from the description presented below.

Through the configuration described above, in case where a station according to the present invention transmits and receives a signal through two bonded channels, the station may configure a pilot sequence for two-channel bonding as in the method proposed in the present invention, whereby a low peak-to-average power ratio (PAPR) may be realized.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
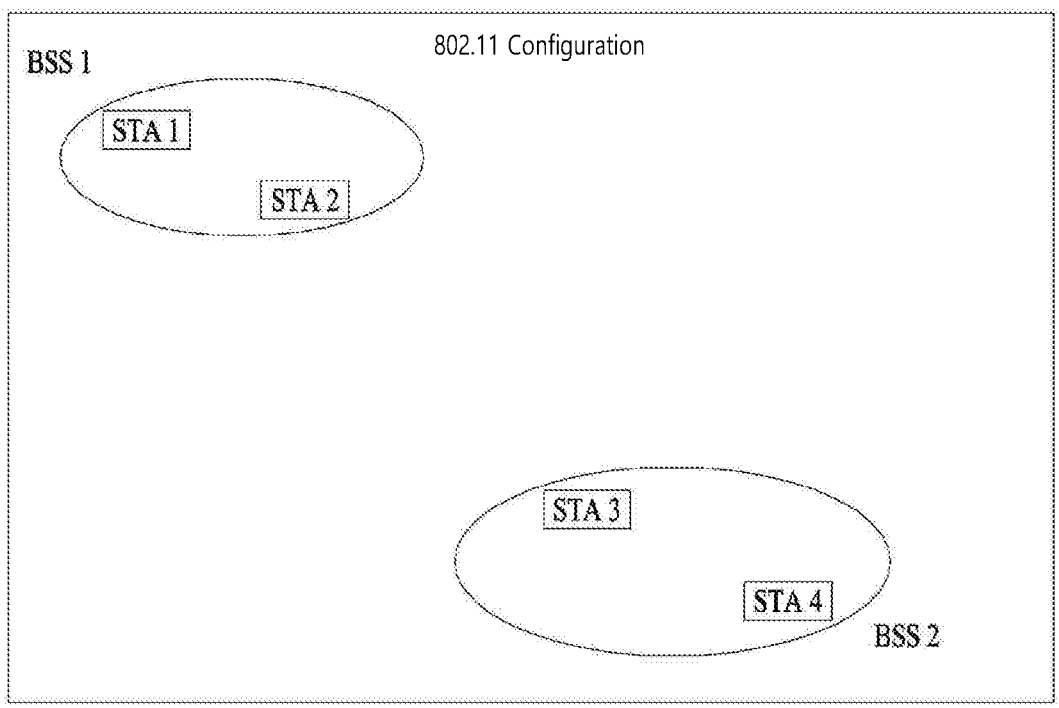
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
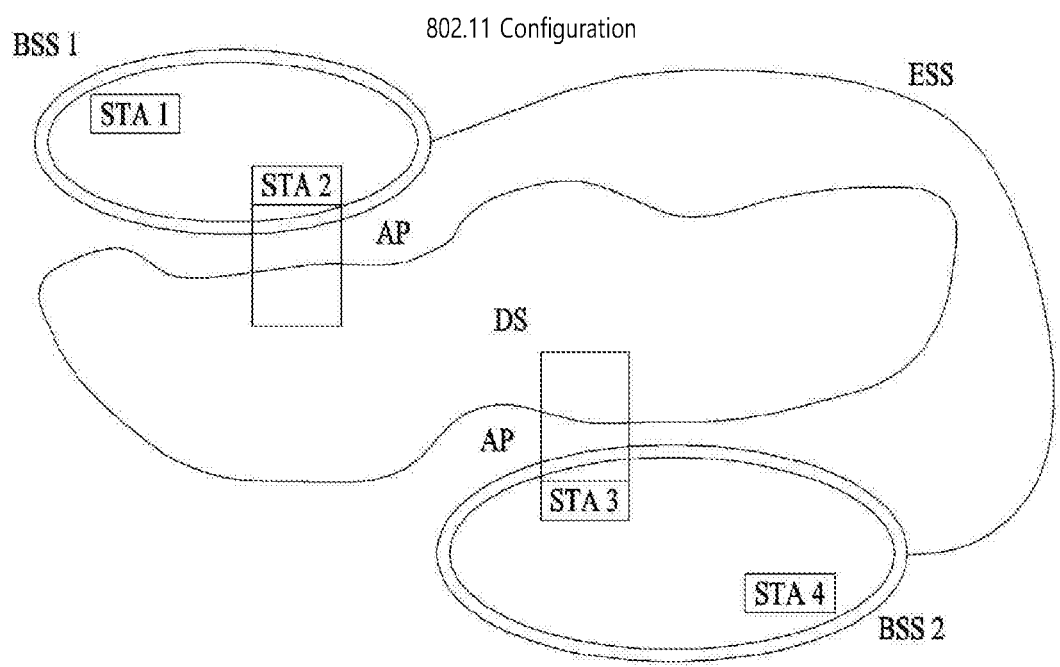
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
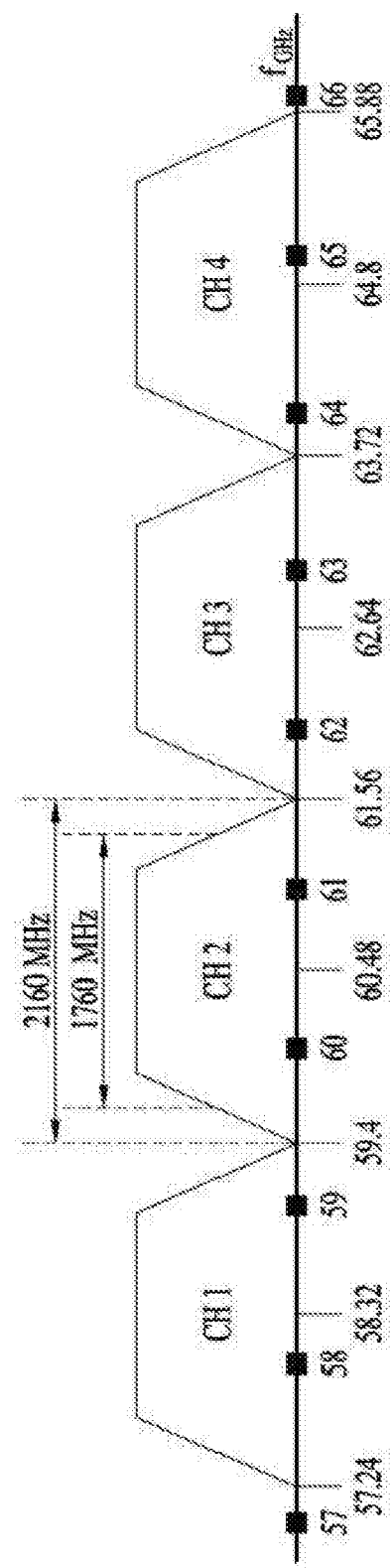
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
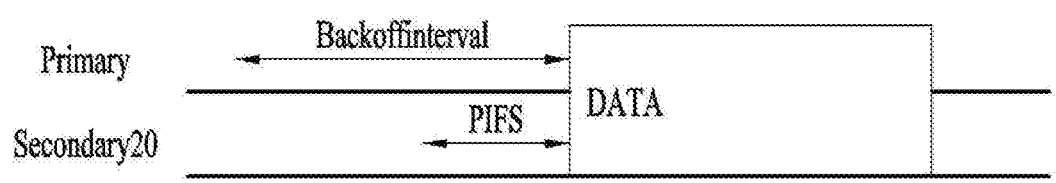
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
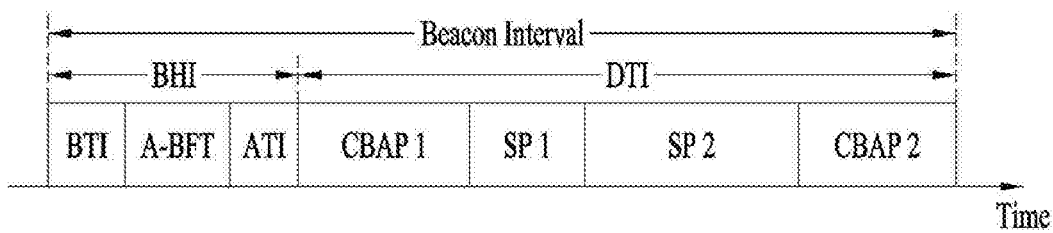
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY | 1 . . . 12 | (low power SC PHY) |

TABLE 1-continued

| PHY | MCS | Note |
|---|---|---|
| (SC PHY) | 25 . . . 31 | |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
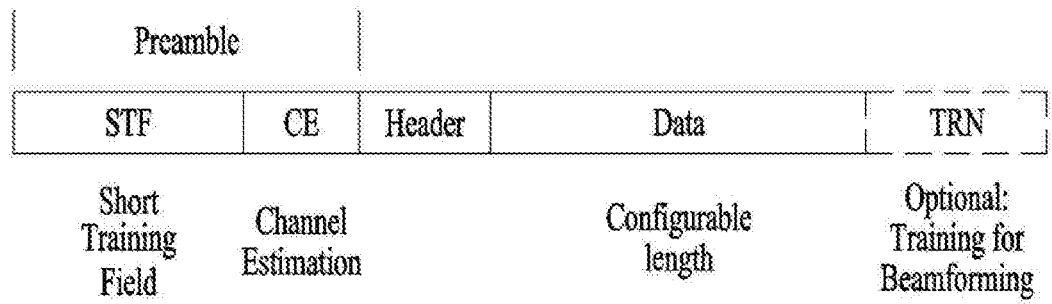
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
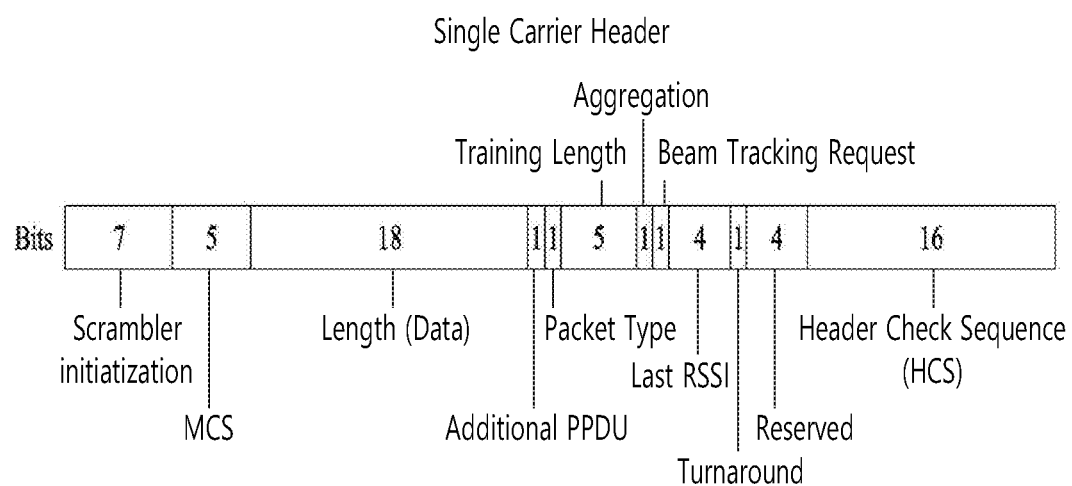
FIG. 7 and FIG. 8 are diagrams describing a configuration of a header field of the radio frame shown in FIG. 6.
Figure 8:
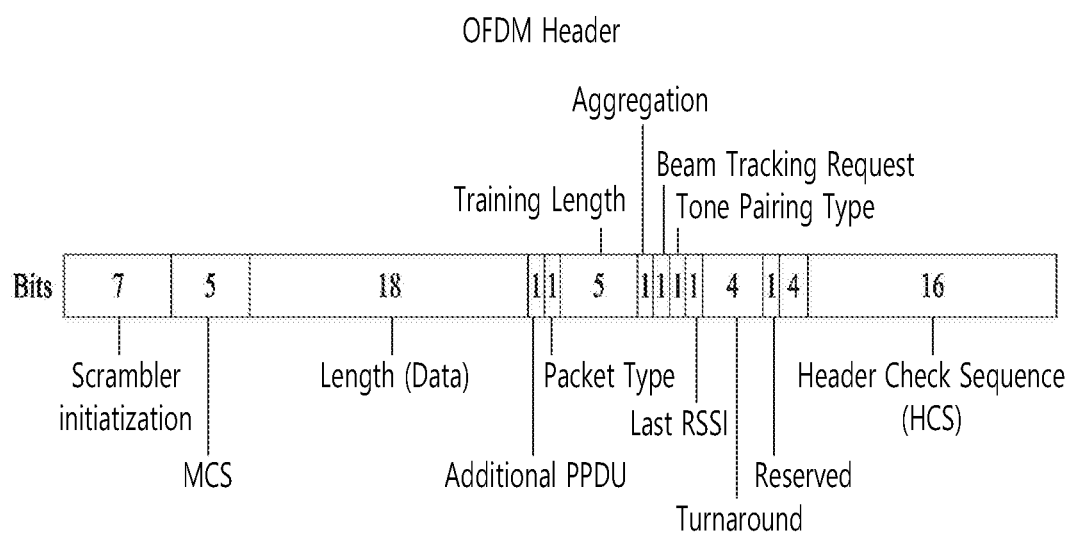

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11 ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
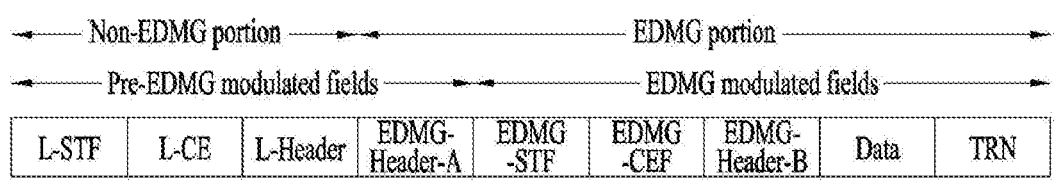
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the PPDU may be used for packet detection, automatic gain control (AGC), frequency offset estimation, synchronization, indication of modulation (SC or OFDM), and channel estimation. A format of the preamble may be common to both OFDM packets and SC packets. Here, the preamble may include a short training field (STF) and a channel estimation (CE) field.

3. Embodiment Applicable to Present Invention

The 11ay system to which the present invention is applicable supports a plurality of channels and a plurality of space-time streams, unlike the 11ad system. For example, the 11ay system may support up to 8 channels and up to 8 space-time streams. Thus, the present invention proposes a configuration of the pilot sequence transmitted by the station STA through bonded channels in case where two of a plurality of channels are bonded and the STA transmits signals through the bonded channels (e.g., two channel bonding (2 CB)).

Basically, the pilot sequence is configured as a sequence having a length of $2*N_{SR}+1$ corresponding to tone indices from $-N_{SR}$ to $N_{SR}$, and in the sequence having the length of $2*N_{SR}+1$, a pilot tone has a corresponding pilot value and the other tones are configured to have a zero value. Here, the $N_{SR}$ value, which is a value indicating the number of subcarriers occupying half of the overall bandwidth, may be set to be different according to the number of bonded channels or the overall bandwidth size. For example, in the case of two-channel bonding, the NSR value may be 386, in the case of three-channel bonding, the $N_{SR}$ value may be 596, and in the case of four-channel bonding, the $N_{SR}$ value may be 805.

In addition, the number of pilot tones may vary depending on the number of bonded channels or the overall bandwidth size. For example, two-channel bonding includes two single channels and a channel spacing between the two channels. Here, one single channel includes 16 pilot tones (or pilot subcarriers), and the channel spacing may include 4 pilot tones. Accordingly, two-channel bonding may include a total of 36 pilot tones.

Similarly, three-channel bonding includes three single channels and two channel spacings, and thus, three-channel bonding may include a total of 56 pilot tones. Four-channel bonding includes four single channels and three channel spacings, and thus, four-channel bonding may include a total of 76 pilot tones.

In the present invention, the station STA may transmit a pilot sequence to another STA to thereby make coherent detection robust against frequency offsets and phase noise. In detail, the STA, which receives the signal, may perform amplitude/phase/timing tracking on the received signal through the received pilot sequence and may reliably receive a data signal received together using the tracking information.

To this end, an STA, which wants to transmit a signal, may transmit the pilot sequence and a data signal together to the other STA.

More specifically, the 11ay system to which the present invention is applicable may support PPDU transmission in an EDMG OFDM mode. Here, one OFDM symbol may include sub-carriers determined according to the number of bonded channels. For example, in the case of two-channel bonding, one OFDM symbol may include 734 data subcarriers, 36 pilot subcarriers, and 3 direct current (DC) subcarriers. In other words, in the case of two-channel bonding, one OFDM symbol may include a total of 773 subcarriers.

Accordingly, the STA, which wants to transmit a signal through two-bonded channels, may transmit a data signal through a data subcarrier (or a data tone) among the 772 sub-carriers and transmit a pilot sequence through a pilot subcarrier (or a pilot tone). Here, the data tone may correspond to a tone having a zero value included in the pilot sequence. Thus, in case where the station STA, which wants to transmit the signal, transmits the pilot sequence and the data signal together, the station STA may transmit a signal in which the pilot sequence and the data signal are combined in a frequency dimension (in other words, a signal including signals corresponding to the pilot tone and the data tone).

Here, since the 11ay system to which the present invention is applicable supports a plurality of channels and a plurality of space-time streams unlike the conventional 11ad system, and it is necessary to design a new pilot sequence different from the conventional one.

Thus, in the present invention, a method of designing a pilot sequence for each space-time stream when a signal is transmitted through a plurality of bonded channels will be described in detail. More specifically, in the present invention, a method of designing a pilot sequence for each space-time stream having a good peak-to-average power ratio (PAPR) performance/characteristics in the case of two-channel bonding will be described in detail.

As described above, a pilot sequence for two-channel bonding may be configured as a pilot sequence having a length of 36, and in order to support up to 8 space-time streams, the 36-length pilot sequence may be defined for each space-time stream.

Hereinafter, in the present invention, a method for designing the 36-length pilot sequence will be described in detail.

Specifically, in a first embodiment of the present invention, a method of utilizing two 16-length pilot sequences and one 4-length pilot sequence to configure a 36-length pilot sequence will be described in detail. Here, the 16-length pilot sequence and the 4-length pilot sequence may be defined for each space-time stream.

In addition, in a second embodiment according to the present invention, a method of utilizing three 12-length pilot sequences to configure a 36-length pilot sequence will be described in detail. Here, the 12-length pilot sequence may be defined for each space-time stream.

3.1. First Embodiment

Hereinafter, a method of configuring a 36-length pilot sequence for two-channel bonding by utilizing two 16-length pilot sequences and one four-length pilot sequence according to the first embodiment of the present invention will be described in detail.

3.1.1. Utilization of 16-Length Pilot Sequence of 11ad System

In this section, a method of configuring a 36-length pilot sequence for two-channel bonding by re-utilizing a pilot sequence of the 11ad system will be described.

In the 11ad system, a 16-length pilot sequence is defined. The 16-length pilot sequence is [−1, 1, −1, 1, 1, −1, −1, −1, −1, −1, 1, 1, 1, −1, 1, 1]. In this section, a method for configuring a 36-length pilot sequence for 2 channel bonding by utilizing the 16-length sequence will be described in detail.

Hereinafter, for the purposes of description, the pilot sequence [−1, 1, −1, 1, 1, −1, −1, −1, −1, −1, 1, 1, 1, −1, 1, 1] defined in the 11ad system will be referred to as a mother sequence. Here, in this section, a method of designing a 16-length sequence for each space-time stream using a scheme of shifting the mother sequence and configuring a 36-length pilot sequence for each space-time stream on the basis of the 16-length sequence for each space-time stream is proposed.

Here, as a method for configuring a 36-length pilot sequence (or extending to 36-length pilot sequence) on the basis of the 16-length sequence for each space-time stream, the following two designing methods are utilized.

(1) First Designing Method ([±Length 16 Pilot Length 4 Pilot Rep ±Length 16 Pilot])

In the first designing method, a method of repeatedly utilizing four mutually orthogonal 4-length sequences as 4-length pilot sequences for each space-time stream for configuring a 36-length pilot sequence is disclosed.

Accordingly, the 4-length pilot sequence corresponding to space-time stream indices 1 to 4 may be the same as a 4-length pilot sequence corresponding to space-time stream indices 5 to 8.

Here, a 4-length pilot sequence for each of up to 8 space-time streams may be defined as follows.

length4_pilot_1_rep=[1 1 1 −1]
length4_pilot_2_rep=[1 1 −1 1]
length4_pilot_3_rep=[1 −1 1 1]
length4_pilot_4_rep=[1 −1 −1 −1]
length4_pilot_5_rep=[1 1 1 −1]
length4_pilot_6_rep=[1 1 −1 1]
length4_pilot_7_rep=[1 −1 1 1]
length4_pilot_8_rep=[1 −1 −1 −1]

(2) Second Designing Method ([±Length 16 Pilot Length 4 Pilot ±Length 16 Pilot])

In the second designing method, a method of utilizing eight mutually orthogonal 4-length sequences as 4-length pilot sequences for each space-time stream for configuring a 36-length pilot sequence is disclosed.

length4_pilot_1=[1 1 1 −1]
length4_pilot_2=[−1 −1 1 −1]
length4_pilot_3=[−1 1 −1 −1]
length4_pilot_4=[1 −1 −1 −1]
length4_pilot_5=[1 1 −1 1]
length4_pilot_6=[−1 −1 −1 1]
length4_pilot_7=[−1 1 1 1]
length4_pilot_8=[1 −1 1 1]

The 36-length pilot sequence which can be obtained through the first designing method or the second designing method may be configured by a total of four cases according to symbols of the 16-length pilot sequence positioned on the left and the 16-length pilot sequence positioned on the right. Specifically, in case where the 36-length pilot sequence (Pilot1_36_N, N=1,2,3,4) is configured by the 16-length pilot sequence (Pilot1_16) for each space-time stream, the 36-length pilot sequence may be configured by a total of four cases as follows.

Pilot1_36_1=[Pilot1_16 length4_pilot_1 Pilot1_16]
Pilot1_36_2=[Pilot1_16 length4_pilot_1 −Pilot1_16]
Pilot1_36_3=[−Pilot1_16 length4_pilot_1 Pilot1_16]
Pilot1_36_4=[−Pilot1_16 length4_pilot_1 −Pilot1_16]

Hereinafter, a method of designing a 16-length pilot sequence for each space-time stream utilized for configuring a 36-length pilot sequence will be described. Here, the 16-length pilot sequence for each space-time stream may be designed through various following methods based on a mother sequence.

3.1.1.1. Method of Shifting One by One in Leftward Direction

In this section, a method of configuring 16-length pilot sequences for each space-time stream by utilizing a total of 16 16-length sequences defined by shifting element values of a mother sequence to the left one by one is proposed. Here, in order to easily express a relationship between the 16 16-length sequences and the mother sequence, positions of an element value '−1' in the 16 16-length sequences corresponding to '−1' which is a first element value of the mother sequence are indicated in bold.

Pilot1_16=[−1, 1, −1, 1, 1, −1, −1, −1, −1, −1, 1, 1, 1, −1, 1, 1]
Pilot2_16=[1, −1, 1, 1, −1, −1, −1, −1, −1, 1, 1, 1, −1, 1, 1, −1]
Pilot3_16=[−1, 1, 1, −1, −1, −1, −1, −1, 1, 1, 1, −1, 1, 1, −1, 1]
Pilot4_16=[1, 1, −1, −1, −1, −1, −1, 1, 1, 1, −1, 1, 1, −1, 1, −1]
Pilot5_16=[1, −1, −1, −1, −1, −1, 1, 1, 1, −1, 1, 1, −1, 1, −1, 1]
Pilot6_16=[−1, −1, −1, −1, −1, 1, 1, 1, −1, 1, 1, −1, 1, −1, 1, 1]
Pilot7_16=[−1, −1, −1, −1, 1, 1, 1, −1, 1, 1, −1, 1, −1, 1, 1, −1]
Pilot8_16=[−1, −1, −1, 1, 1, 1, −1, 1, 1, −1, 1, −1, 1, 1, −1, −1]
Pilot9_16=[−1, −1, 1, 1, 1, −1, 1, 1, −1, 1, −1, 1, 1, −1, −1, −1]
Pilot10_16=[−1, 1, 1, 1, −1, 1, 1, −1, 1, −1, 1, 1, −1, −1, −1, −1]
Pilot11_16=[1, 1, 1, −1, 1, 1, −1, 1, −1, 1, 1, −1, −1, −1, −1, −1]
Pilot12_16=[1, 1, −1, 1, 1, −1, 1, −1, 1, 1, −1, −1, −1, −1, −1, 1]
Pilot13_16=[1, −1, 1, 1, −1, 1, −1, 1, 1, −1, −1, −1, −1, −1, 1, 1]
Pilot14_16=[−1, 1, 1, −1, 1, −1, 1, 1, −1, −1, −1, −1, −1, 1, 1, 1]
Pilot15_16=[1, 1, −1, 1, −1, 1, 1, −1, −1, −1, −1, −1, 1, 1, 1, −1]
Pilot16_16=[1, −1, 1, −1, 1, 1, −1, −1, −1, −1, −1, 1, 1, 1, −1, 1]

Accordingly, the STA may configure 36-length pilot sequences for two-channel bonding supporting up to 8 space-time streams by selecting arbitrarily 8 16-length pilot sequences out of the 16 sequences. Here, the first designing method or the second designing method described above may be applied as a method of configuring the 36-length pilot sequences for two-channel bonding using/based on the 16-length pilot sequence for each space-time stream.

Specifically, when the 36-length pilot sequences for two-channel bonding are configured by selecting certain 8 16-length pilot sequences from among the 16 sequences and applying the first designing method, the 36-length pilot sequences for each space-time stream may be configured as follows.

Pilot1_36=[Pilot1_16 length4_pilot_1_rep Pilot1_16]
Pilot2_36=[Pilot2_16 length4_pilot_2_rep Pilot2_16]
Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]
Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by selecting certain 8 16-length pilot sequences from among the 16 sequences and applying the second designing method, the 36-length pilot sequences for each space-time stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

3.1.1.2. Method of Shifting by Two in Leftward Direction

In this section, a method of configuring 16-length pilot sequences for each space-time stream by utilizing a total of 8 16-length sequences defined by shifting element values of a mother sequence to the left by two is proposed. Here, in order to easily express a relationship between the 8 16-length sequences and the mother sequence, positions of the element values '−1, 1' in the 8 16-length sequences corresponding to '−1' which is a first element value of the mother sequence and '1' which is a second element value of the mother sequence are indicated in bold.

Pilot1_16=[−1, 1, −1, 1, 1, −1, −1, −1, −1, −1, 1, 1, 1, −1, 1, 1]
Pilot2_16=[−1, 1, 1, −1, −1, −1, −1, −1, 1, 1, 1, −1, 1, 1, −1, 1]
Pilot3_16=[1, −1, −1, −1, −1, −1, 1, 1, 1, −1, 1, 1, −1, 1, −1, 1]
Pilot4_16=[−1, −1, −1, −1, 1, 1, 1, −1, 1, 1, −1, 1, −1, 1, 1, −1]
Pilot5_16=[−1, −1, 1, 1, 1, −1, 1, 1, −1, 1, −1, 1, 1, −1, −1, −1]
Pilot6_16=[1, 1, 1, −1, 1, 1, −1, 1, −1, 1, 1, −1, −1, −1, −1, −1]
Pilot7_16=[1, −1, 1, 1, −1, 1, −1, 1, 1, −1, −1, −1, −1, −1, 1, 1]
Pilot8_16=[1, 1, −1, 1, −1, 1, 1, −1, −1, −1, −1, −1, 1, 1, 1, −1]

Accordingly, the STA may configure 36-length pilot sequences for two-channel bonding supporting up to 8 space-time streams using/based on the 8 sequences. Here, the STA may apply the first designing method or the second designing method described above as a method for configuring the 36-length pilot sequences for two-channel bonding.

Specifically, when the 36-length pilot sequences for two-channel bonding are configured by applying the first designing method to the 8 16-length pilot sequences, the 36-length pilot sequences for each time-space stream may be configured as follows.

Pilot1_36=[Pilot1_16 length4_pilot_1_rep Pilot1_16]
Pilot2_36=[Pilot2_16 length4_pilot_2_rep Pilot2_16]
Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]
Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by applying the second designing method to the 8 16-length pilot sequences, the 36-length pilot sequences for each time-space stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

3.1.1.3. Method of Shifting One by One in Rightward Direction

In this section, a method for configuring a 16-length pilot sequence for each space-time stream by utilizing a total of 16-length sequences defined by shifting an element value of the mother sequence to the right is proposed. Here, in order to easily express a relationship between the 16 16-length sequences and the mother sequence, positions of an element value '−1' in the 16 16-length sequences corresponding to '−1' which is a first element value of the mother sequence are indicated in bold.

Pilot1_16=[−1, 1, −1, 1, 1, −1, −1, −1, −1, −1, 1, 1, 1, −1, 1, 1]
Pilot2_16=[1, −1, 1, −1, 1, 1, −1, −1, −1, −1, −1, 1, 1, 1, −1, 1]
Pilot3_16=[1, 1, −1, 1, −1, 1, 1, −1, −1, −1, −1, −1, 1, 1, 1, −1]
Pilot4_16=[−1, 1, 1, −1, 1, −1, 1, 1, −1, −1, −1, −1, −1, 1, 1, 1]
Pilot5_16=[1, −1, 1, 1, −1, 1, −1, 1, 1, −1, −1, −1, −1, −1, 1, 1]
Pilot6_16=[1, 1, −1, 1, 1, −1, 1, −1, 1, 1, −1, −1, −1, −1, −1, 1]
Pilot7_16=[1, 1, 1, −1, 1, 1, −1, 1, −1, 1, 1, −1, −1, −1, −1, −1]
Pilot8_16=[−1, 1, 1, 1, −1, 1, 1, −1, 1, −1, 1, 1, −1, −1, −1, −1]
Pilot9_16=[−1, −1, 1, 1, 1, −1, 1, 1, −1, 1, −1, 1, 1, −1, −1, −1]
Pilot10_16=[4, −1, −1, 1, 1, 1, −1, 1, 1, −1, 1, −1, 1, 1, −1, −1]
Pilot11_16=[−1, −1, −1, −1, 1, 1, 1, −1, 1, 1, −1, 1, −1, 1, 1, −1]
Pilot12_16=[−1, −1, −1, −1, −1, 1, 1, 1, −1, 1, 1, −1, 1, −1, 1, 1]
Pilot13_16=[1, −1, −1, −1, −1, −1, 1, 1, 1, −1, 1, 1, −1, 1, −1, 1]
Pilot14_16=[1, 1, −1, −1, −1, −1, −1, 1, 1, 1, −1, 1, 1, −1, 1, −1]
Pilot15_16=[−1, 1, 1, −1, −1, −1, −1, −1, 1, 1, 1, −1, 1, 1, −1, 1]
Pilot16_16=[1, −1, 1, 1, −1, −1, −1, −1, −1, 1, 1, 1, −1, 1, 1, −1]

Accordingly, the STA may configure 36-length pilot sequences for two-channel bonding supporting up to 8 space-time streams by selecting arbitrarily 8 16-length pilot sequences out of the 16 sequences. Here, the first designing method or the second designing method described above may be applied as a method of configuring the 36-length pilot sequences for two-channel bonding using/based on the 16-length pilot sequence for each space-time stream.

Specifically, when the 36-length pilot sequences for two-channel bonding are configured by selecting certain 8 16-length pilot sequences from among the 16 sequences and applying the first designing method, the 36-length pilot sequences for each space-time stream may be configured as follows.

Pilot1_36=[Pilot1_16 length4_pilot_1_rep Pilot1_16]
Pilot2_36=[Pilot2_16 length4_pilot_2_rep Pilot2_16]

Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]
Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by selecting certain 8 16-length pilot sequences from among the 16 sequences and applying the second designing method, the 36-length pilot sequences for each space-time stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

3.1.1.4. Method of Shifting by Two in Rightward Direction

In this section, a method of configuring 16-length pilot sequences for each space-time stream by utilizing a total of 8 16-length sequences defined by shifting element values of a mother sequence to the right by two is proposed. Here, in order to easily express a relationship between the 8 16-length sequences and the mother sequence, positions of the element values '-1, 1' in the 8 16-length sequences corresponding to '-1' which is a first element value of the mother sequence and '1' which is a second element value of the mother sequence are indicated in bold.

Pilot1_16=[−1, 1, −1, 1, 1, −1, −1, −1, −1, −1, 1, 1, 1, −1, 1, 1]
Pilot2_16=[1, 1, −1, 1, −1, 1, 1, −1, −1, −1, −1, −1, 1, 1, 1, −1]
Pilot3_16=[1, −1, 1, 1, −1, 1, −1, 1, 1, −1, −1, −1, −1, −1, 1, 1]
Pilot4_16=[1, 1, 1, −1, 1, 1, −1, 1, −1, 1, 1, −1, −1, −1, −1, −1]
Pilot5_16=[−1, −1, 1, 1, 1, −1, 1, 1, −1, 1, −1, 1, 1, −1, −1, −1]
Pilot6_16=[−1, −1, −1, −1, 1, 1, 1, −1, 1, 1, −1, 1, −1, 1, 1, −1]
Pilot7_16=[1, −1, −1, −1, −1, −1, 1, 1, 1, −1, 1, 1, −1, 1, −1, 1]
Pilot8_16=[−1, 1, 1, −1, −1, −1, −1, −1, 1, 1, 1, −1, 1, 1, −1, 1]

Accordingly, the STA may configure 36-length pilot sequences for two-channel bonding supporting up to 8 space-time streams using/based on the 8 sequences. Here, the STA may apply the first designing method or the second designing method described above as a method for configuring the 36-length pilot sequences for two-channel bonding.

Specifically, when the 36-length pilot sequences for two-channel bonding are configured by applying the first designing method to the 8 16-length pilot sequences, the 36-length pilot sequences for each time-space stream may be configured as follows.

Pilot1_36=[Pilot1_16 length4_pilot_1_rep Pilot1_16]
Pilot2_36=[Pilot2_16 length4_pilot_2_rep Pilot2_16]
Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]
Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by applying the second designing method to the 8 16-length pilot sequences, the 36-length pilot sequences for each time-space stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

3.1.1.5. Method of Changing Shift and Coefficient

In this section, a method of configuring a 16-length pilot sequence for each space-time stream by utilizing 8 mutually orthogonal 16-length sequences by shifting an element value of the mother sequence and changing coefficients of some element values is proposed. For example, the 8 16-length sequence may be defined as follows.

Pilot1_16=[−1, 1, −1, 1, 1, −1, −1, −1, −1, −1, 1, 1, 1, −1, 1, 1]
Pilot2_16=[1, −1, 1, 1, −1, −1, −1, −1, −1, 1, 1, 1, −1, 1, 1, −1]
Pilot3_16=[−1, 1, 1, −1, −1, −1, −1, −1, 1, 1, 1, −1, 1, 1, −1, 1]
Pilot4_16=[1, 1, −1, −1, −1, −1, −1, 1, 1, 1, −1, 1, 1, −1, 1, −1]
Pilot5_16=[1, −1, −1, −1, −1, −1, 1, 1, −1, −1, 1, 1, 1, 1, −1, 1]
Pilot6_16=[−1, 1, −1, 1, −1, 1, 1, 1, 1, −1, −1, −1, 1]
Pilot7_16=[−1, −1, 1, 1, −1, 1, −1, 1, 1, −1, 1, 1, 1, −1]
Pilot8_16=[−1, −1, −1, −1, 1, −1, 1, −1, 1, 1, −1, 1, −1, 1, 1, 1]

Accordingly, the STA may configure 36-length pilot sequences for two-channel bonding supporting up to 8 space-time streams using/based on the 8 sequences. Here, the STA may apply the first designing method or the second designing method described above as a method for configuring the 36-length pilot sequences for two-channel bonding.

Specifically, when the 36-length pilot sequences for two-channel bonding are configured by applying the first designing method to the 8 16-length pilot sequences, the 36-length pilot sequences for each time-space stream may be configured as follows.

Pilot1_36=[Pilot1_16 length4_pilot_1_rep Pilot1_16]
Pilot2_36=[Pilot2_16 length4_pilot_2_rep Pilot2_16]
Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]

Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by applying the second designing method to the 8 16-length pilot sequences, the 36-length pilot sequences for each time-space stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N. The pilot sequences for each space-time stream may be determined in consideration of PAPR characteristics.

3.1.2. Utilization of Hadamard Matrix

In this section, a method of configuring a 36-length pilot sequence for two-channel bonding by utilizing characteristics of a Hadamard matrix.

The Hadamard matrix has characteristics that all the rows are orthogonal to each other. Thus, in this section, a method of configuring a pilot sequence for each space-time stream using the characteristics of the Hadamard matrix is proposed.

First, the Hadamard matrix having a 16×16 size may be expressed as follows.

$$H_{16} = \begin{bmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{bmatrix}$$

[Equation 1]

Thus, when each row of the Hadamard matrix having the 16×16 size is utilized as a 16-length pilot sequence, 16 available 16-length pilot sequences may be defined as follows.

Pilot1_16=[1, 1, 1, 1, 1, 1, 1, 1, 1, 1, 1, 1, 1, 1, 1, 1]
Pilot2_16=[1, -1, 1, -1, 1, -1, 1, -1, 1, -1, 1, -1, 1, -1, 1, -1]
Pilot3_16=[1, 1, -1, -1, 1, 1, -1, -1, 1, 1, -1, -1, 1, 1, -1, -1]
Pilot4_16=[1, -1, -1, 1, 1, -1, -1, 1, 1, -1, -1, 1, 1, -1, -1, 1]
Pilot5_16=[1, 1, 1, 1, -1, -1, -1, -1, 1, 1, 1, 1, -1, -1, -1, -1]
Pilot6_16=[1, -1, 1, -1, -1, 1, -1, 1, 1, -1, 1, -1, -1, 1, -1, 1]
Pilot7_16=[1, 1, -1, -1, -1, -1, 1, 1, 1, 1, -1, -1, -1, -1, 1, 1]
Pilot8_16=[1, -1, -1, 1, -1, 1, 1, -1, 1, -1, -1, 1, -1, 1, 1, -1]
Pilot9_16=[1, 1, 1, 1, 1, 1, 1, 1, -1, -1, -1, -1, -1, -1, -1, -1]
Pilot10_16=[1, -1, 1, -1, 1, -1, 1, -1, -1, 1, -1, 1, -1, 1, -1, 1]
Pilot11_16=[1, 1, -1, -1, 1, 1, -1, -1, -1, -1, 1, 1, -1, -1, 1, 1]
Pilot12_16=[1, -1, -1, 1, 1, -1, -1, 1, -1, 1, 1, -1, -1, 1, 1, -1]
Pilot13_16=[1, 1, 1, 1, -1, -1, -1, -1, -1, -1, -1, -1, 1, 1, 1, 1]
Pilot14_16=[1, -1, 1, -1, -1, 1, -1, 1, -1, 1, -1, 1, 1, -1, 1, -1]
Pilot15_16=[1, 1, -1, -1, -1, -1, 1, 1, -1, -1, 1, 1, 1, 1, -1, -1]
Pilot16_16=[1, -1, -1, 1, -1, 1, 1, -1, -1, 1, 1, -1, 1, -1, -1, 1]

Accordingly, the STA may configure 36-length pilot sequences for two-channel bonding supporting up to 8 space-time streams by selecting arbitrarily 8 16-length pilot sequences out of the 16 sequences. Here, the first designing method or the second designing method described above may be applied as a method of configuring the 36-length pilot sequences for two-channel bonding using/based on the 16-length pilot sequence for each space-time stream.

Specifically, when the 36-length pilot sequences for two-channel bonding are configured by selecting certain 8 16-length pilot sequences from among the 16 sequences and applying the first designing method, the 36-length pilot sequences for each space-time stream may be configured as follows.

Pilot1_36=[Pilot1_16 length4_pilot_1_rep Pilot1_16]
Pilot2_36=[Pilot2_16 length4_pilot_2_rep Pilot2_16]

Pilot3_36=[Pilot3_16 length4_pilot_3_rep Pilot3_16]
Pilot4_36=[Pilot4_16 length4_pilot_4_rep Pilot4_16]
Pilot5_36=[Pilot5_16 length4_pilot_5_rep Pilot5_16]
Pilot6_36=[Pilot6_16 length4_pilot_6_rep Pilot6_16]
Pilot7_36=[Pilot7_16 length4_pilot_7_rep Pilot7_16]
Pilot8_36=[Pilot8_16 length4_pilot_8_rep Pilot8_16]

Also, when the 36-length pilot sequences for two-channel bonding are configured by selecting certain 8 16-length pilot sequences from among the 16 sequences and applying the second designing method, the 36-length pilot sequences for each space-time stream may be configured as follows.

Pilot1_36=[Pilot1_16 length4_pilot_1 Pilot1_16]
Pilot2_36=[Pilot2_16 length4_pilot_2 Pilot2_16]
Pilot3_36=[Pilot3_16 length4_pilot_3 Pilot3_16]
Pilot4_36=[Pilot4_16 length4_pilot_4 Pilot4_16]
Pilot5_36=[Pilot5_16 length4_pilot_5 Pilot5_16]
Pilot6_36=[Pilot6_16 length4_pilot_6 Pilot6_16]
Pilot7_36=[Pilot7_16 length4_pilot_7 Pilot7_16]
Pilot8_36=[Pilot8_16 length4_pilot_8 Pilot8_16]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

3.1.3. Utilization of Same Pilot Sequence for Every Space-Time Stream

In this section, a method of configuring the same 36-length pilot sequence for every space-time stream by utilizing one of the 16-length pilot sequences derived according to the section 3.1.1. or the section 3.1.2 described above will be described.

For example, a 36-length pilot sequence for two-channel bonding may be configured by applying the first designing method or the second designing method to one of the 8 16-length pilot sequences derived in the section 3.1.1.5 described above. Accordingly, 36-length pilot sequences for each space-time stream may all be the same.

In another example, a 36-length pilot sequence for two-channel bonding may be configured by applying the first designing method or the second designing method to one of the 16 16-length pilot sequences derived in the section 3.1.2 described above. Accordingly, 36-length pilot sequences for each space-time stream may all be the same.

3.2. Second Embodiment

Hereinafter, a method of configuring a 36-length pilot sequence for two-channel bonding by utilizing three 12-length pilot sequences according to a second embodiment of the present invention will be described in detail.

In detail, according to the second embodiment of the present invention, the STA may configure mutually orthogonal 8 12-length sequences as 12-length pilot sequences for each space-time stream and configure a 36-length sequence for two-channel bonding by utilizing three 12-length pilot sequences for each space-time stream.

Here, as a sequence set including mutually orthogonal 8 12-length sequences, one of the following various sequence sets may be applied. Here, each row of the sequence sets mentioned below refers to a 12-length pilot sequence and may correspond to different space-time stream indices. Here, the 12-length sequence corresponding to each row of the sequence sets below may correspond to any one of up to 8 space-time streams, regardless of order. For example, a 12-length pilot sequence corresponding to a first row may correspond to a space-time stream index 1 or a space-time stream index 5.

TABLE 2

| | | | | | | | | | | | | |
|---|---|---|---|---|---|---|---|---|---|---|---|---|
| (1) | 1 | −1 | 1 | −1 | 1 | 1 | −1 | −1 | −1 | 1 | −1 | 1 |
| | −1 | 1 | −1 | 1 | 1 | 1 | −1 | −1 | 1 | −1 | −1 | 1 |
| | 1 | −1 | −1 | 1 | 1 | −1 | 1 | −1 | 1 | 1 | −1 | −1 |
| | 1 | −1 | −1 | −1 | 1 | −1 | −1 | 1 | 1 | −1 | 1 | 1 |
| | −1 | 1 | 1 | −1 | 1 | −1 | 1 | 1 | 1 | 1 | −1 | 1 |
| | −1 | −1 | 1 | −1 | 1 | −1 | 1 | 1 | −1 | 1 | 1 | −1 |
| | −1 | 1 | 1 | 1 | 1 | 1 | −1 | 1 | 1 | 1 | 1 | −1 |
| | −1 | −1 | 1 | 1 | −1 | 1 | −1 | −1 | −1 | 1 | 1 | 1 |
| (2) | −1 | 1 | −1 | 1 | 1 | −1 | −1 | −1 | −1 | 1 | 1 | 1 |
| | 1 | −1 | 1 | 1 | −1 | −1 | −1 | −1 | 1 | 1 | 1 | −1 |
| | −1 | 1 | 1 | −1 | −1 | −1 | −1 | 1 | 1 | 1 | −1 | 1 |
| | 1 | 1 | −1 | −1 | −1 | −1 | 1 | 1 | 1 | −1 | 1 | −1 |
| | 1 | −1 | −1 | −1 | −1 | 1 | 1 | 1 | −1 | 1 | −1 | 1 |
| | 1 | 1 | 1 | 1 | −1 | 1 | 1 | 1 | 1 | 1 | 1 | 1 |
| | 1 | 1 | 1 | −1 | 1 | 1 | 1 | −1 | −1 | −1 | 1 | 1 |
| | 1 | 1 | −1 | 1 | 1 | 1 | −1 | −1 | 1 | −1 | −1 | −1 |
| (3) | −1 | 1 | −1 | 1 | 1 | −1 | −1 | −1 | −1 | 1 | 1 | 1 |
| | 1 | −1 | 1 | 1 | −1 | −1 | −1 | −1 | 1 | 1 | 1 | −1 |
| | −1 | 1 | 1 | −1 | −1 | −1 | −1 | 1 | 1 | 1 | −1 | 1 |
| | 1 | 1 | −1 | −1 | −1 | −1 | 1 | 1 | 1 | −1 | 1 | −1 |
| | 1 | −1 | −1 | −1 | −1 | 1 | 1 | 1 | −1 | 1 | −1 | 1 |
| | 1 | 1 | 1 | 1 | −1 | 1 | 1 | 1 | 1 | 1 | 1 | 1 |
| | 1 | 1 | 1 | −1 | 1 | 1 | 1 | −1 | −1 | −1 | 1 | 1 |
| | 1 | 1 | −1 | 1 | 1 | 1 | −1 | −1 | 1 | −1 | −1 | −1 |
| (4) | −1 | 1 | −1 | 1 | 1 | −1 | −1 | −1 | −1 | 1 | 1 | 1 |
| | 1 | −1 | 1 | 1 | −1 | −1 | −1 | −1 | 1 | 1 | 1 | −1 |
| | −1 | 1 | 1 | −1 | −1 | −1 | −1 | 1 | 1 | 1 | −1 | 1 |
| | 1 | 1 | −1 | −1 | −1 | −1 | 1 | 1 | 1 | −1 | 1 | −1 |
| | 1 | −1 | −1 | −1 | −1 | 1 | 1 | 1 | −1 | 1 | −1 | 1 |
| | 1 | 1 | 1 | 1 | −1 | 1 | 1 | 1 | 1 | 1 | 1 | 1 |
| | 1 | 1 | 1 | −1 | 1 | 1 | 1 | −1 | −1 | −1 | 1 | 1 |
| | 1 | 1 | −1 | 1 | 1 | 1 | −1 | −1 | 1 | −1 | −1 | −1 |
| (5) | −1 | 1 | −1 | 1 | 1 | −1 | −1 | −1 | −1 | 1 | 1 | 1 |
| | 1 | −1 | 1 | 1 | −1 | −1 | −1 | −1 | 1 | 1 | 1 | −1 |
| | −1 | 1 | 1 | −1 | −1 | −1 | −1 | 1 | 1 | 1 | −1 | 1 |
| | 1 | 1 | −1 | −1 | −1 | −1 | 1 | 1 | 1 | −1 | 1 | −1 |
| | 1 | −1 | −1 | −1 | −1 | 1 | 1 | 1 | −1 | 1 | −1 | 1 |
| | 1 | 1 | 1 | 1 | −1 | 1 | 1 | 1 | 1 | 1 | 1 | 1 |
| | 1 | 1 | 1 | −1 | 1 | 1 | 1 | −1 | −1 | −1 | 1 | 1 |
| | 1 | −1 | −1 | −1 | 1 | 1 | −1 | 1 | 1 | 1 | 1 | 1 |

TABLE 3

| | | | | | | | | | | | | |
|---|---|---|---|---|---|---|---|---|---|---|---|---|
| (6) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | −1 | 1 | 1 | −1 | 1 |
| | 1 | 1 | −1 | −1 | −1 | −1 | −1 | 1 | 1 | −1 | 1 | −1 |
| | 1 | −1 | −1 | −1 | −1 | −1 | 1 | 1 | −1 | 1 | −1 | 1 |
| | 1 | 1 | 1 | 1 | −1 | 1 | 1 | 1 | 1 | 1 | 1 | 1 |
| | 1 | 1 | 1 | −1 | −1 | 1 | 1 | −1 | −1 | −1 | 1 | 1 |
| | −1 | 1 | 1 | 1 | −1 | 1 | 1 | −1 | −1 | −1 | −1 | −1 |
| (7) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | −1 | 1 | 1 | −1 | 1 |
| | 1 | 1 | −1 | −1 | −1 | −1 | −1 | 1 | 1 | −1 | 1 | −1 |
| | 1 | −1 | −1 | −1 | −1 | −1 | 1 | 1 | −1 | 1 | −1 | 1 |
| | 1 | 1 | 1 | 1 | −1 | 1 | 1 | 1 | 1 | 1 | 1 | 1 |
| | 1 | −1 | −1 | −1 | 1 | 1 | −1 | −1 | 1 | 1 | 1 | 1 |
| | −1 | −1 | −1 | 1 | 1 | −1 | 1 | 1 | 1 | 1 | −1 | −1 |
| (8) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | −1 | 1 | 1 | −1 | 1 |
| | 1 | 1 | −1 | −1 | −1 | −1 | −1 | 1 | 1 | −1 | 1 | −1 |
| | 1 | −1 | −1 | −1 | −1 | −1 | 1 | 1 | −1 | 1 | −1 | 1 |
| | 1 | 1 | 1 | 1 | −1 | 1 | 1 | 1 | 1 | 1 | 1 | 1 |
| | −1 | 1 | 1 | −1 | −1 | 1 | 1 | −1 | −1 | −1 | −1 | −1 |
| (9) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | −1 | 1 | 1 | −1 | 1 |
| | 1 | 1 | −1 | −1 | −1 | −1 | −1 | 1 | 1 | −1 | 1 | −1 |
| | 1 | −1 | −1 | −1 | −1 | −1 | 1 | 1 | −1 | 1 | −1 | 1 |
| | 1 | −1 | −1 | −1 | −1 | 1 | 1 | −1 | 1 | −1 | 1 | 1 |
| | 1 | 1 | 1 | 1 | −1 | −1 | 1 | 1 | 1 | 1 | 1 | 1 |

TABLE 3-continued

(10)
$$\begin{pmatrix} -1 & -1 & -1 & 1 & -1 & 1 & -1 & 1 & 1 & 1 & 1 & 1 \\ -1 & -1 & -1 & -1 & 1 & -1 & 1 & -1 & 1 & 1 & 1 & -1 \\ -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & -1 & 1 & 1 & -1 & 1 \\ 1 & 1 & 1 & -1 & -1 & -1 & -1 & 1 & 1 & 1 & -1 & -1 \\ 1 & -1 & -1 & -1 & -1 & -1 & 1 & 1 & -1 & 1 & -1 & 1 \\ 1 & 1 & 1 & 1 & -1 & 1 & -1 & 1 & -1 & -1 & -1 & 1 \\ 1 & 1 & 1 & -1 & 1 & -1 & 1 & -1 & -1 & -1 & -1 \\ -1 & -1 & -1 & -1 & -1 & -1 & 1 & -1 & -1 & -1 & -1 & -1 \end{pmatrix}$$

TABLE 4

(11)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & -1 & 1 & -1 & 1 & -1 & -1 & 1 \\ 1 & 1 & 1 & -1 & 1 & -1 & 1 & -1 & -1 & -1 & 1 \\ 1 & 1 & -1 & 1 & -1 & 1 & -1 & 1 & 1 & 1 & 1 \end{pmatrix}$$

(12)
$$\begin{pmatrix} -1 & 1 & -1 & 1 & -1 & -1 & -1 & -1 & 1 & 1 & 1 \\ 1 & -1 & 1 & -1 & 1 & -1 & -1 & -1 & 1 & 1 & -1 \\ -1 & 1 & -1 & -1 & -1 & -1 & 1 & 1 & 1 & 1 \\ 1 & -1 & -1 & -1 & -1 & 1 & 1 & -1 & 1 & -1 & 1 \\ 1 & -1 & -1 & -1 & 1 & 1 & -1 & 1 & -1 & 1 & 1 \\ 1 & 1 & -1 & -1 & 1 & -1 & 1 & 1 & 1 & 1 & 1 \end{pmatrix}$$

(13)
$$\begin{pmatrix} -1 & -1 & 1 & -1 & 1 & -1 & -1 & -1 & -1 & 1 & 1 \\ -1 & 1 & -1 & 1 & -1 & -1 & -1 & -1 & 1 & 1 & -1 \\ 1 & -1 & 1 & -1 & -1 & -1 & -1 & 1 & 1 & -1 & 1 \\ -1 & -1 & -1 & -1 & -1 & 1 & 1 & -1 & 1 & -1 & 1 \\ 1 & -1 & -1 & -1 & 1 & 1 & -1 & 1 & -1 & 1 & 1 \\ -1 & 1 & -1 & 1 & -1 & 1 & -1 & 1 & 1 & 1 & 1 \end{pmatrix}$$

(14)
$$\begin{pmatrix} -1 & 1 & -1 & 1 & -1 & 1 & -1 & -1 & -1 & 1 & 1 \\ 1 & -1 & 1 & -1 & 1 & -1 & -1 & -1 & 1 & 1 & -1 \\ -1 & 1 & -1 & -1 & -1 & -1 & 1 & 1 & 1 & 1 \\ 1 & -1 & -1 & -1 & -1 & 1 & 1 & -1 & 1 & -1 & 1 \\ 1 & -1 & -1 & 1 & 1 & -1 & 1 & -1 & 1 & 1 & 1 \\ 1 & 1 & -1 & 1 & -1 & 1 & 1 & 1 & 1 & -1 \end{pmatrix}$$

(15)
$$\begin{pmatrix} -1 & 1 & -1 & 1 & -1 & 1 & -1 & -1 & -1 & 1 & 1 \\ 1 & -1 & 1 & -1 & 1 & -1 & -1 & -1 & 1 & 1 & -1 \\ -1 & 1 & -1 & -1 & -1 & -1 & 1 & 1 & 1 & -1 & 1 \\ 1 & -1 & -1 & -1 & -1 & 1 & 1 & -1 & 1 & -1 & 1 \\ 1 & -1 & -1 & 1 & -1 & 1 & -1 & 1 & -1 & 1 & 1 \\ 1 & 1 & 1 & -1 & 1 & -1 & 1 & -1 & -1 & 1 & 1 \\ -1 & -1 & 1 & -1 & -1 & 1 & -1 & -1 & -1 & -1 & -1 \end{pmatrix}$$

TABLE 5

(16)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & -1 & 1 & 1 & -1 & 1 & -1 & 1 \\ 1 & 1 & -1 & -1 & 1 & 1 & 1 & -1 & -1 & -1 & 1 \\ 1 & -1 & -1 & 1 & 1 & -1 & -1 & -1 & 1 & -1 & 1 \end{pmatrix}$$

(17)
$$\begin{pmatrix} -1 & 1 & -1 & 1 & -1 & 1 & -1 & -1 & -1 & 1 & 1 \\ 1 & -1 & 1 & -1 & 1 & -1 & -1 & -1 & -1 & 1 & 1 \\ -1 & 1 & -1 & 1 & -1 & -1 & -1 & -1 & 1 & 1 & 1 \\ 1 & -1 & 1 & -1 & -1 & -1 & -1 & 1 & 1 & -1 & 1 \\ 1 & -1 & -1 & -1 & -1 & 1 & 1 & 1 & -1 & 1 & -1 \\ 1 & -1 & -1 & -1 & 1 & 1 & -1 & 1 & -1 & 1 & 1 \\ -1 & 1 & -1 & 1 & 1 & -1 & 1 & 1 & 1 & 1 & 1 \end{pmatrix}$$

(18)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & -1 & 1 & 1 & 1 \end{pmatrix}$$

TABLE 5-continued $$\begin{pmatrix} 1 & 1 & -1 & -1 & -1 & -1 & 1 & 1 & -1 & 1 & -1 \\ 1 & -1 & -1 & -1 & -1 & 1 & 1 & 1 & -1 & 1 & 1 \\ 1 & 1 & 1 & -1 & 1 & 1 & 1 & -1 & 1 & 1 & 1 \\ 1 & -1 & 1 & -1 & 1 & 1 & -1 & 1 & -1 & 1 \end{pmatrix}$$

(19)
$$\begin{pmatrix} -1 & 1 & -1 & 1 & -1 & -1 & -1 & -1 & 1 & 1 \\ 1 & -1 & 1 & -1 & 1 & -1 & -1 & -1 & 1 & 1 & -1 \\ -1 & 1 & -1 & 1 & -1 & -1 & -1 & -1 & 1 & 1 & 1 \\ 1 & -1 & -1 & -1 & -1 & 1 & 1 & -1 & 1 & -1 & 1 \\ 1 & -1 & -1 & -1 & 1 & -1 & 1 & -1 & 1 & 1 & 1 \\ 1 & 1 & -1 & 1 & -1 & 1 & 1 & 1 & -1 & 1 \\ -1 & 1 & -1 & -1 & 1 & -1 & -1 & -1 & 1 & 1 & -1 \end{pmatrix}$$

(20)
$$\begin{pmatrix} -1 & 1 & -1 & 1 & -1 & 1 & -1 & -1 & -1 & 1 & 1 \\ 1 & -1 & 1 & -1 & 1 & -1 & -1 & -1 & 1 & 1 & -1 \\ -1 & 1 & -1 & -1 & -1 & -1 & 1 & 1 & -1 & 1 \\ 1 & -1 & -1 & -1 & -1 & 1 & 1 & -1 & -1 & 1 \\ 1 & -1 & 1 & 1 & -1 & 1 & -1 & 1 & -1 & 1 & 1 \\ 1 & -1 & 1 & 1 & -1 & 1 & 1 & 1 & -1 & 1 & 1 \\ -1 & -1 & -1 & 1 & -1 & 1 & -1 & 1 & 1 & 1 & 1 \end{pmatrix}$$

TABLE 6

(21)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & -1 & 1 & 1 & -1 & 1 \\ 1 & 1 & -1 & -1 & -1 & -1 & 1 & -1 & 1 & -1 & 1 \\ 1 & -1 & -1 & -1 & -1 & 1 & -1 & 1 & -1 & 1 & 1 \\ 1 & -1 & -1 & 1 & 1 & -1 & 1 & -1 & -1 & 1 & 1 \\ -1 & 1 & -1 & -1 & 1 & -1 & -1 & -1 & -1 & 1 \end{pmatrix}$$

(22)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & -1 & 1 & 1 & -1 & 1 & -1 & 1 \\ 1 & 1 & -1 & -1 & 1 & 1 & 1 & -1 & -1 & 1 & 1 \\ -1 & 1 & 1 & -1 & 1 & 1 & -1 & -1 & -1 & 1 \end{pmatrix}$$

(23)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & -1 & 1 & -1 & -1 & -1 & -1 & 1 & 1 & -1 & 1 \\ 1 & -1 & -1 & -1 & -1 & 1 & 1 & -1 & 1 & -1 & 1 \\ 1 & -1 & -1 & -1 & 1 & 1 & -1 & 1 & -1 & 1 & 1 \\ 1 & -1 & 1 & -1 & 1 & 1 & -1 & -1 & 1 & 1 & 1 \\ -1 & 1 & -1 & 1 & -1 & -1 & 1 & 1 & -1 & -1 & 1 \end{pmatrix}$$

(24)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & 1 & 1 & -1 & 1 & -1 & 1 & 1 \\ 1 & 1 & 1 & -1 & 1 & -1 & 1 & -1 & -1 & -1 & 1 \\ -1 & -1 & 1 & -1 & 1 & -1 & -1 & -1 & -1 & -1 & -1 \end{pmatrix}$$

(25)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & -1 & 1 & 1 & -1 & 1 & -1 & 1 \\ 1 & 1 & 1 & -1 & -1 & 1 & -1 & -1 & 1 & 1 & -1 \\ -1 & 1 & -1 & 1 & -1 & 1 & -1 & 1 & -1 & -1 & -1 \end{pmatrix}$$

TABLE 7

(26)
$$\begin{pmatrix} -1 & 1 & -1 & 1 & 1 & -1 & -1 & -1 & -1 & 1 & 1 \\ 1 & -1 & 1 & 1 & -1 & -1 & -1 & -1 & 1 & 1 & -1 \\ -1 & 1 & 1 & -1 & -1 & -1 & -1 & 1 & 1 & -1 & 1 \\ 1 & 1 & -1 & -1 & -1 & -1 & 1 & 1 & -1 & 1 & -1 \\ 1 & -1 & -1 & -1 & -1 & 1 & 1 & -1 & 1 & -1 & 1 \\ 1 & 1 & -1 & -1 & 1 & 1 & 1 & -1 & -1 & -1 & 1 \\ -1 & -1 & 1 & -1 & -1 & 1 & -1 & 1 & 1 & 1 & -1 \\ -1 & -1 & -1 & -1 & 1 & -1 & -1 & -1 & -1 & -1 & -1 \end{pmatrix}$$

TABLE 7-continued

| | | | | | | | | | | | | |
|---|---|---|---|---|---|---|---|---|---|---|---|---|
| (27) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | 1 | 1 | −1 | 1 | |
| | 1 | 1 | −1 | −1 | −1 | −1 | 1 | 1 | −1 | 1 | −1 | |
| | 1 | −1 | −1 | −1 | −1 | 1 | 1 | −1 | 1 | −1 | 1 | |
| | 1 | 1 | 1 | −1 | −1 | 1 | 1 | −1 | −1 | 1 | 1 | |
| | 1 | 1 | −1 | −1 | 1 | 1 | −1 | −1 | 1 | −1 | −1 | |
| | 1 | −1 | −1 | 1 | −1 | 1 | −1 | 1 | 1 | −1 | 1 | |
| (28) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | 1 | 1 | −1 | 1 | |
| | 1 | 1 | −1 | −1 | −1 | −1 | 1 | 1 | −1 | 1 | −1 | |
| | 1 | −1 | −1 | −1 | −1 | 1 | 1 | −1 | 1 | −1 | 1 | |
| | 1 | 1 | 1 | −1 | −1 | 1 | 1 | −1 | 1 | 1 | | |
| | 1 | 1 | −1 | −1 | 1 | 1 | −1 | 1 | −1 | −1 | | |
| | −1 | 1 | 1 | 1 | 1 | −1 | 1 | 1 | −1 | 1 | | |
| (29) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | −1 | 1 | 1 | −1 | 1 | |
| | 1 | −1 | −1 | −1 | −1 | 1 | 1 | −1 | 1 | −1 | 1 | |
| | 1 | 1 | 1 | −1 | −1 | 1 | 1 | −1 | 1 | 1 | | |
| | 1 | 1 | −1 | −1 | 1 | 1 | −1 | 1 | −1 | −1 | | |
| | 1 | −1 | −1 | 1 | 1 | −1 | 1 | −1 | −1 | 1 | | |
| | −1 | 1 | 1 | 1 | −1 | 1 | 1 | −1 | 1 | 1 | | |
| (30) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | −1 | 1 | 1 | −1 | 1 | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | 1 | −1 | 1 | 1 | | |
| | 1 | −1 | 1 | 1 | 1 | 1 | 1 | 1 | 1 | 1 | | |
| | −1 | −1 | −1 | −1 | 1 | −1 | −1 | −1 | −1 | −1 | | |

TABLE 8

| | | | | | | | | | | | | |
|---|---|---|---|---|---|---|---|---|---|---|---|---|
| (31) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | 1 | 1 | −1 | 1 | −1 |
| | 1 | 1 | −1 | −1 | −1 | −1 | 1 | 1 | −1 | 1 | −1 | −1 |
| | 1 | −1 | −1 | −1 | −1 | 1 | 1 | −1 | 1 | −1 | −1 | 1 |
| | 1 | 1 | 1 | −1 | −1 | 1 | 1 | −1 | −1 | 1 | 1 | |
| | 1 | 1 | −1 | −1 | 1 | 1 | 1 | −1 | −1 | 1 | 1 | |
| | −1 | −1 | −1 | −1 | −1 | 1 | 1 | −1 | −1 | −1 | −1 | |
| (32) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | −1 | 1 | −1 | 1 | −1 | 1 | 1 | | |
| | 1 | −1 | 1 | 1 | −1 | 1 | −1 | 1 | 1 | −1 | | |
| | −1 | 1 | 1 | −1 | 1 | 1 | 1 | 1 | −1 | 1 | | |
| (33) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | 1 | 1 | −1 | 1 | 1 | | |
| | 1 | −1 | 1 | 1 | 1 | −1 | −1 | 1 | −1 | −1 | | |
| | −1 | 1 | 1 | 1 | −1 | 1 | 1 | 1 | 1 | 1 | | |
| (34) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | 1 | −1 | 1 | −1 | | |
| | 1 | −1 | 1 | 1 | −1 | 1 | −1 | 1 | −1 | −1 | | |
| | −1 | 1 | 1 | −1 | 1 | −1 | 1 | −1 | −1 | 1 | | |
| (35) | −1 | 1 | −1 | 1 | 1 | −1 | −1 | −1 | −1 | 1 | 1 | |
| | 1 | −1 | 1 | 1 | −1 | −1 | −1 | 1 | 1 | −1 | | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | 1 | 1 | −1 | −1 | | |
| | 1 | 1 | −1 | 1 | −1 | 1 | −1 | −1 | 1 | 1 | | |
| | 1 | −1 | 1 | −1 | 1 | −1 | −1 | 1 | −1 | −1 | | |

TABLE 9

| | | | | | | | | | | | | |
|---|---|---|---|---|---|---|---|---|---|---|---|---|
| (36) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | 1 | 1 | −1 | 1 | |
| | 1 | 1 | −1 | −1 | −1 | −1 | 1 | 1 | −1 | 1 | −1 | |
| | 1 | −1 | −1 | −1 | −1 | 1 | 1 | −1 | 1 | −1 | 1 | |
| | 1 | 1 | 1 | −1 | −1 | 1 | 1 | −1 | −1 | 1 | 1 | |
| | 1 | 1 | −1 | −1 | 1 | 1 | −1 | −1 | 1 | −1 | −1 | |
| | 1 | −1 | 1 | 1 | −1 | 1 | −1 | 1 | −1 | 1 | −1 | |
| (37) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | −1 | 1 | 1 | 1 | −1 | 1 | −1 | | |
| | 1 | −1 | 1 | 1 | 1 | −1 | 1 | 1 | 1 | −1 | | |
| | −1 | 1 | 1 | 1 | −1 | 1 | −1 | 1 | −1 | −1 | | |
| (38) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | 1 | −1 | 1 | −1 | | |
| | 1 | −1 | 1 | 1 | −1 | 1 | −1 | 1 | −1 | −1 | | |
| | −1 | 1 | 1 | −1 | 1 | −1 | 1 | −1 | 1 | −1 | | |
| (39) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | −1 | 1 | 1 | −1 | 1 | −1 | | |
| | 1 | 1 | 1 | −1 | 1 | 1 | −1 | 1 | −1 | −1 | | |
| | −1 | 1 | −1 | 1 | 1 | −1 | 1 | −1 | −1 | 1 | | |
| (40) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | −1 | 1 | −1 | −1 | | |
| | 1 | −1 | 1 | 1 | −1 | −1 | 1 | −1 | 1 | 1 | | |
| | −1 | 1 | −1 | 1 | −1 | 1 | −1 | 1 | −1 | −1 | | |

TABLE 10

| | | | | | | | | | | | | |
|---|---|---|---|---|---|---|---|---|---|---|---|---|
| (41) | −1 | 1 | −1 | 1 | 1 | −1 | −1 | −1 | −1 | −1 | 1 | 1 |
| | 1 | −1 | 1 | 1 | −1 | −1 | −1 | −1 | −1 | 1 | 1 | −1 |
| | −1 | 1 | 1 | −1 | −1 | −1 | −1 | 1 | 1 | −1 | 1 | |
| | 1 | 1 | −1 | −1 | −1 | −1 | 1 | 1 | −1 | 1 | −1 | |
| | 1 | −1 | −1 | −1 | −1 | 1 | 1 | −1 | 1 | −1 | 1 | |
| | 1 | 1 | 1 | −1 | 1 | 1 | 1 | 1 | 1 | 1 | | |
| | 1 | 1 | −1 | 1 | −1 | 1 | −1 | 1 | −1 | −1 | | |
| | −1 | −1 | 1 | 1 | 1 | 1 | −1 | −1 | −1 | −1 | | |
| (42) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | −1 | 1 | −1 | 1 | 1 | 1 | −1 | | |
| | 1 | −1 | 1 | 1 | −1 | 1 | 1 | 1 | −1 | −1 | | |
| | −1 | 1 | 1 | −1 | 1 | 1 | 1 | −1 | −1 | −1 | | |
| (43) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | 1 | −1 | 1 | 1 | 1 | −1 | | |
| | 1 | −1 | 1 | −1 | 1 | 1 | 1 | 1 | −1 | 1 | | |
| | −1 | 1 | −1 | 1 | 1 | 1 | 1 | −1 | 1 | −1 | | |
| (44) | −1 | 1 | −1 | 1 | 1 | −1 | −1 | −1 | −1 | 1 | 1 | |
| | 1 | −1 | 1 | 1 | −1 | −1 | −1 | −1 | 1 | 1 | −1 | |
| | −1 | 1 | 1 | −1 | −1 | −1 | 1 | 1 | −1 | 1 | | |
| | 1 | 1 | −1 | −1 | −1 | 1 | 1 | −1 | 1 | −1 | | |
| | 1 | −1 | −1 | −1 | 1 | 1 | −1 | 1 | −1 | 1 | | |
| | 1 | 1 | 1 | 1 | −1 | −1 | 1 | 1 | 1 | 1 | | |
| | 1 | 1 | 1 | −1 | 1 | 1 | 1 | −1 | 1 | 1 | | |
| | −1 | −1 | −1 | −1 | 1 | −1 | 1 | −1 | 1 | −1 | | |

TABLE 10-continued

(45)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

TABLE 11

(46)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(47)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(48)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(49)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(50)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | -1 | 1 | -1 | 1 | 1 | -1 | -1 | -1 |

TABLE 12

(51)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(52)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(53)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| 1 | -1 | -1 | -1 | -1 | 1 | 1 | -1 | 1 | -1 | 1 | -1 |

TABLE 12-continued

| 1 | -1 | 1 | -1 | 1 | -1 | 1 | -1 | 1 | -1 | 1 | 1 |
| -1 | -1 | 1 | -1 | 1 | -1 | -1 | 1 | -1 | -1 | -1 | -1 |
| -1 | -1 | -1 | 1 | -1 | -1 | 1 | -1 | 1 | -1 | -1 | -1 |

(54)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(55)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

TABLE 13

(56)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(57)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(58)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(59)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(60)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

TABLE 14

(61)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |
| -1 | 1 | 1 | -1 | -1 | -1 | -1 | -1 | 1 | 1 | -1 | 1 |
| 1 | 1 | -1 | -1 | -1 | -1 | -1 | 1 | 1 | -1 | 1 | -1 |
| 1 | -1 | -1 | -1 | -1 | -1 | 1 | 1 | -1 | 1 | -1 | 1 |
| -1 | -1 | -1 | -1 | -1 | 1 | 1 | -1 | 1 | -1 | 1 | 1 |
| -1 | -1 | -1 | -1 | 1 | 1 | -1 | 1 | -1 | 1 | 1 | -1 |
| -1 | -1 | -1 | 1 | 1 | -1 | 1 | -1 | 1 | 1 | -1 | -1 |

(62)
| -1 | 1 | -1 | 1 | 1 | -1 | -1 | -1 | -1 | -1 | 1 | 1 |
| 1 | -1 | 1 | 1 | -1 | -1 | -1 | -1 | -1 | 1 | 1 | -1 |

TABLE 14-continued (63)

| | | | | | | | | | | | |
|---|---|---|---|---|---|---|---|---|---|---|---|
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |
| −1 | −1 | −1 | 1 | 1 | 1 | −1 | 1 | −1 | 1 | −1 | 1 |
| −1 | 1 | −1 | 1 | 1 | −1 | −1 | −1 | −1 | 1 | 1 | 1 |
| 1 | −1 | 1 | 1 | −1 | 1 | −1 | −1 | 1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | 1 | −1 |
| −1 | −1 | 1 | 1 | −1 | 1 | −1 | 1 | −1 | 1 | 1 | 1 |
| −1 | −1 | −1 | 1 | 1 | 1 | −1 | 1 | −1 | 1 | −1 | 1 |

(64)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | 1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |

(65)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | 1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| −1 | −1 | −1 | 1 | 1 | 1 | 1 | 1 | 1 | 1 | 1 | 1 |
| −1 | −1 | 1 | 1 | −1 | 1 | 1 | 1 | 1 | 1 | 1 | −1 |
| −1 | −1 | 1 | 1 | 1 | 1 | −1 | 1 | 1 | 1 | 1 | −1 |
| −1 | −1 | −1 | 1 | −1 | −1 | 1 | 1 | 1 | 1 | −1 | −1 |

TABLE 15

(66)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | 1 | 1 | 1 | −1 | 1 | −1 | 1 |
| −1 | 1 | −1 | 1 | −1 | 1 | −1 | 1 | −1 | 1 | −1 | −1 |
| −1 | 1 | 1 | −1 | 1 | −1 | −1 | −1 | 1 | 1 | −1 | 1 |

(67)

| | | | | | | | | | | | |
|---|---|---|---|---|---|---|---|---|---|---|---|
| −1 | −1 | 1 | 1 | −1 | 1 | −1 | 1 | 1 | −1 | 1 | 1 |
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |

(68)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |

(69)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |

(70)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| −1 | −1 | −1 | −1 | 1 | 1 | −1 | −1 | 1 | 1 | 1 | −1 |

TABLE 16

(71)

| | | | | | | | | | | | |
|---|---|---|---|---|---|---|---|---|---|---|---|
| −1 | 1 | −1 | 1 | 1 | −1 | −1 | −1 | −1 | 1 | 1 | |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | 1 | −1 |
| −1 | −1 | 1 | −1 | 1 | −1 | 1 | 1 | −1 | −1 | 1 | 1 |

(72)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |

(73)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |

(74)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |

(75)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |
| −1 | −1 | −1 | 1 | −1 | −1 | 1 | 1 | 1 | 1 | 1 | 1 |

TABLE 17

(76)

| | | | | | | | | | | | |
|---|---|---|---|---|---|---|---|---|---|---|---|
| −1 | 1 | −1 | 1 | 1 | −1 | −1 | −1 | −1 | 1 | 1 | |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |

(77)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | 1 | 1 |

(78)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |
| −1 | −1 | 1 | −1 | 1 | −1 | −1 | 1 | −1 | −1 | −1 | −1 |

(79)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |
| −1 | 1 | 1 | −1 | −1 | −1 | −1 | −1 | 1 | 1 | −1 | 1 |
| 1 | 1 | −1 | −1 | −1 | −1 | −1 | 1 | 1 | −1 | 1 | −1 |
| 1 | −1 | −1 | −1 | −1 | −1 | 1 | 1 | −1 | 1 | −1 | 1 |
| −1 | 1 | −1 | 1 | −1 | 1 | −1 | 1 | −1 | 1 | −1 | −1 |

(80)

| | | | | | | | | | | | |
|---|---|---|---|---|---|---|---|---|---|---|---|
| −1 | 1 | −1 | 1 | 1 | −1 | −1 | −1 | −1 | 1 | 1 | 1 |
| 1 | −1 | 1 | 1 | −1 | 1 | −1 | −1 | −1 | 1 | 1 | −1 |

TABLE 17-continued

```
 -1   1   1  -1  -1  -1  -1  -1   1   1  -1   1
  1   1  -1  -1  -1  -1  -1   1   1  -1   1  -1
  1  -1  -1  -1   1  -1  -1   1  -1   1  -1   1
 -1   1  -1   1  -1  -1   1   1  -1   1  -1  -1
 -1  -1   1   1   1  -1  -1   1   1  -1  -1  -1
 -1  -1   1  -1  -1  -1   1   1  -1  -1   1   1
```

TABLE 18

```
(81)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(82)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(83)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(84)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(85)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
```

TABLE 19

```
(86)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(87)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(88)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(89)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(90)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
```

TABLE 20

```
(91)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(92)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(93)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
(94)  -1   1  -1   1   1  -1  -1  -1  -1   1   1
       1  -1   1   1  -1  -1  -1  -1  -1   1   1  -1
      -1   1   1  -1  -1  -1  -1  -1   1   1  -1   1
       1   1  -1  -1  -1  -1  -1   1   1  -1   1  -1
       1  -1  -1  -1  -1  -1   1   1  -1   1  -1   1
      -1  -1  -1  -1  -1   1   1  -1   1  -1   1   1
      -1  -1  -1  -1   1   1  -1   1  -1   1   1  -1
      -1  -1  -1   1   1  -1   1  -1   1   1  -1  -1
```

In case where one of a total of 94 sequence sets included in Table 2 and Table 20 is selected, a 12-length sequence corresponding to each row of the selected sequence set may correspond to each space-time stream. For example, in case where $94^{th}$ sequence set is selected, 12-length pilot sequences for each space-time stream may be defined as follows.

pilot1_12=[−1, 1, −1, 1, 1, −1, −1, −1, −1, −1, 1, 1]
pilot2_12=[1, −1, 1, 1, −1, −1, −1, −1, −1, 1, 1, −1]
pilot3_12=[−1, 1, 1, −1, −1, −1, −1, −1, 1, 1, −1, 1]
pilot4_12=[1, 1, −1, −1, −1, −1, −1, 1, 1, −1, 1, −1]
pilot5_12=[1, −1, −1, −1, 1, −1, −1, 1, −1, 1, −1, 1]
pilot6_12=[−1, −1, 1, −1, −1, −1, 1, 1, −1, −1, 1, 1]
pilot7_12=[−1, −1, −1, 1, −1, 1, −1, 1, 1, 1, 1, 1]
pilot8_12=[−1, −1, −1, −1, 1, −1, 1, −1, 1, 1, 1, −1]

Accordingly, the STA may configure 36-length pilot sequences for two-channel bonding by utilizing the 8 pilot sequences as 12-length pilot sequences for each space-time stream as follows.

pilot1_36=[±pilot1_12 ±pilot1_12 ±pilot1_12]
pilot2_36=[±pilot2_12 ±pilot2_12 ±pilot2_12]
pilot3_36=[±pilot3_12 ±pilot3_12 ±pilot3_12]
pilot4_36=[±pilot4_12 ±pilot4_12 ±pilot4_12]
pilot5_36=[±pilot5_12 ±pilot5_12 ±pilot5_12]
pilot6_36=[±pilot6_12 ±pilot6_12 ±pilot6_12]
pilot7_36=[±pilot7_12 ±pilot7_12 ±pilot7_12]
pilot8_36×[±pilot8_12 ±pilot8_12 ±pilot8_12]

In addition, the 36-length pilot sequences (PilotN_36) for each space-time stream described above are merely classified for the purposes of description and the pilot sequences are not limited to the pilot sequences for each space-time stream in order. In other words, the PilotN_36 may refer to a 36-length pilot sequence corresponding to a space-time stream index i, and here, i may have values from 1 to 8, regardless of N.

The sequences for each space-time stream configured as described above may have mutually orthogonal characteristics.

In another example of the second embodiment of the present invention, the STA may use the same pilot sequence for each space-time stream as a 36-length pilot sequence for two-channel bonding.

Specifically, the STA may configure a 36-length pilot sequence by repeatedly placing one of the various 12-length pilot sequences described above three times consecutively. Here, the same 36-length pilot sequence may be applied as the 36-length pilot sequences for every space-time stream.

In this manner, in the 11ay system applicable to the present invention, the STA may configure the 36-length pilot sequence for two-channel bonding in various manners and transmit only the configured pilot sequence or the pilot sequence and a data signal together to another STA.

The STA may utilize a pilot sequence set having good PAPR characteristics (or a low PAPR), among 36-length pilot sequences for various two-channel bonding as a pilot sequence for up to 8 space-time streams. To this end, the STA may configure a 36-length pilot sequence for two-channel bonding using/based on a 12-length sequence for each mutually orthogonal space-time stream. In particular, the STA may configure a pilot sequence for each space-time stream using/based on 12-length pilot sequences corresponding to a $94^{th}$ sequence set in Table 20 above in consideration of the PAPR characteristics.

Hereinafter, the above embodiment will be described in more detail.

Figure 11:
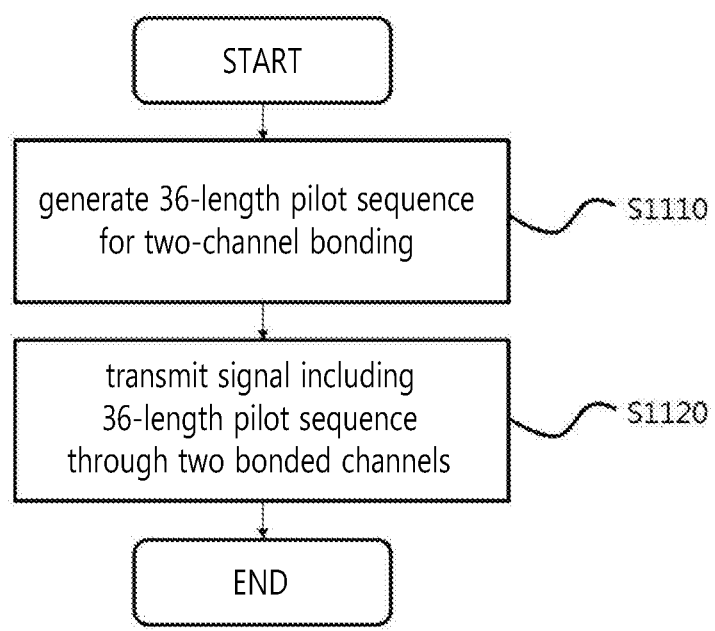
FIG. 11 is a flowchart illustrating a method for transmitting a signal including a pilot sequence through two bonded channels by a station according to an embodiment of the present invention.

FIG. 11 is a flowchart illustrating a method of transmitting a signal including a pilot sequence through two bonded channels by an STA according to an embodiment of the present invention.

The STA configures or generates a pilot sequence for two bonded channels are bonded (S1110). Here, the 11ay system according to the present invention supports up to 8 space-time streams are supported, and thus, the STA may configure or generate up to 8 pilot sequences for each space-time stream.

Here, configuring or generating, by the STA, a pilot sequence may refer to inserting a pilot value corresponding to a pilot tone in a zero sequence having a predetermined length.

As described above, a pilot sequence having a length of 36 may be applied as a pilot sequence for two-channel bonding. In a preferred example, the pilot sequence having the length of 36 may be configured by repeating a mutually orthogonal 12-length pilot sequence in each space-time stream three times as shown in Table 21 below. In other words, when the 12-length pilot sequence for a particular space-time stream is assumed to be 'A', the pilot sequence for two-channel bonding for the particular space-time stream may be configured as 'A A A'.

In Table 21, $P_{12}(i_{STS},:)$ denotes/is a 12-length pilot sequence for each space-time stream, and $i_{STS}$ denotes/is a space-time stream index.

TABLE 21

| $i_{STS}$ | $P_{12}(i_{STS},:)$ |
|---|---|
| 1 | [−1 +1 −1 +1 +1 −1 −1 −1 −1 −1 +1 +1] |
| 2 | [+1 −1 +1 +1 −1 −1 −1 −1 −1 +1 +1 −1] |
| 3 | [−1 +1 +1 −1 −1 −1 −1 +1 +1 −1 +1] |
| 4 | [+1 +1 −1 −1 −1 −1 +1 +1 −1 +1 −1] |
| 5 | [+1 −1 −1 −1 +1 −1 −1 +1 −1 +1 −1 +1] |
| 6 | [−1 −1 +1 −1 −1 −1 +1 +1 −1 −1 +1 +1] |
| 7 | [−1 −1 −1 +1 −1 +1 −1 +1 +1 +1 +1 +1] |
| 8 | [−1 −1 −1 −1 +1 −1 +1 −1 +1 +1 +1 −1] |

Next, the STA transmits a signal including the 36-length pilot sequence through the two bonded channels (S1120). Here, the signal may include only the 36-length pilot sequence or may include the 36-length pilot sequence and a data signal corresponding thereto.

A STA, which receives the signal including the 36-length pilot sequence and the corresponding data signal, performs tracking on the two bonded channels through the 36-length pilot sequence and decode (or demodulate) the data signal on the basis of a result of the tracking. In other words, the STA may decode or demodulate the received data signal together on the basis of information on the received the 36-length pilot sequence.

4. Device Configuration

Figure 12:
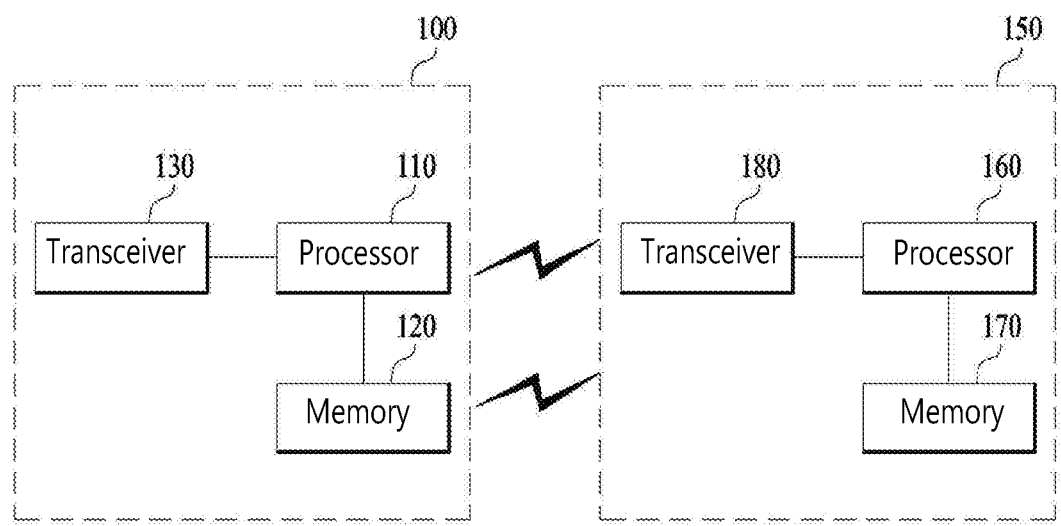
FIG. 12 is a diagram describing a device for implementing the above-described method.

FIG. 12 is a diagram describing a device for implementing the above-described method.

A wireless device (100) of FIG. 12 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method in a wireless LAN (WLAN) system, the method comprising:
    generating, by a first station (STA) supporting a plurality of space time streams (STSs), a first pilot sequence having a length of 36 for two 2.16 GHz channels based on a second pilot sequence having a length of 12,
    wherein the second pilot sequence is repeated three times in the first pilot sequence,
    wherein the first pilot sequence is generated for an enhanced directional multi-gigabit physical protocol data unit (EDMG PPDU),
    wherein the second pilot sequence is set to one sequence among a plurality of candidate pilot sequences based on an index of an STS to be used for the EDMG PPDU,
    wherein each of the plurality of candidate pilot sequences has a length of 12,
    wherein the plurality of candidate pilot sequences are configured for the plurality of STSs, respectively,
    wherein the plurality of the candidate pilot sequences are mutually orthogonal, and
    wherein a maximum number of the plurality of STSs is eight; and
    transmitting, by the first STA to a second STA, the EDMG PPDU including the first pilot sequence through the two 2.16 GHz channels.

2. The method of claim 1, wherein
    the first pilot sequence includes 36 elements being mapped to 36 subcarriers, and the second pilot sequence includes 12 elements being mapped to 12 subcarriers.

3. The method of claim 1, wherein
    the two 2.16 GHz channels are bonded for the EDMG PPDU.

4. The method of claim 1, wherein
    the plurality of the candidate pilot sequences include:
    a first candidate pilot sequence of [−1 +1 −1 +1 +1 −1 −1 −1 −1 −1 +1 +1] being used for a first STS,
    a second candidate pilot sequence of [+1 −1 +1 +1 −1 −1 −1 −1 −1 +1 +1 −1] being used for a second STS,
    a third candidate pilot sequence of [−1 +1 +1 −1 −1 −1 −1 −1 +1 +1 −1 +1] being used for a third STS,
    a fourth candidate pilot sequence of [+1 +1 −1 −1 −1 −1 −1 +1 +1 −1 +1 −1] being used for a fourth STS,
    a fifth candidate pilot sequence of [+1 −1 −1 −1 +1 −1 −1 +1 −1 +1 −1 +1] being used for a fifth STS,
    a sixth candidate pilot sequence of [−1 −1 +1 −1 −1 −1 +1 +1 −1 −1 +1 +1] being used for a sixth STS,
    a seventh candidate pilot sequence of [−1 −1 −1 +1 −1 +1 −1 +1 +1 +1 +1 +1] being used for a seventh STS, and
    an eighth candidate pilot sequence of [−1 −1 −1 −1 +1 −1 +1 −1 +1 +1 +1 −1] being used for an eighth STS.

5. A first station (STA) supporting a plurality of space time streams (STSs) in a wireless LAN (WLAN) system, the station comprising:
    a transceiver having at least one radio frequency (RF) chain and configured to transmit a radio signal; and
    a processor connected to the transceiver unit,
    wherein the processor is configured to:
    generate a first pilot sequence having a length of 36 for two 2.16 GHz channels based on a second pilot sequence having a length of 12,
    wherein the second pilot sequence is repeated three times in the first pilot sequence,
    wherein the first pilot sequence is generated for an enhanced directional multi-gigabit physical protocol data unit (EDMG PPDU),
    wherein the second pilot sequence is set to one sequence among a plurality of candidate pilot sequences based on an index of an STS to be used for the EDMG PPDU,
    wherein each of the plurality of candidate pilot sequences has a length of 12,
    wherein the plurality of candidate pilot sequences are configured for the plurality of STSs, respectively,
    wherein the plurality of the candidate pilot sequences are mutually orthogonal, and
    wherein a maximum number of the plurality of STSs is eight; and
    transmit, via the transceiver, the EDMG PPDU including the first pilot sequence through the two 2.16 GHz channels.

6. The first STA of claim 5, wherein the first pilot sequence includes 36 elements being mapped to 36 subcarriers, and the second pilot sequence includes 12 elements being mapped to 12 subcarriers.

7. The first STA of claim 5, wherein the two 2.16 GHz channels are bonded for the EDMG PPDU.

8. The first STA of claim 5, wherein the plurality of the candidate pilot sequences include:
    a first candidate pilot sequence of [−1 +1 −1 +1 +1 −1 −1 −1 −1 −1 +1 +1] being used for a first STS,
    a second candidate pilot sequence of [+1 −1 +1 +1 −1 −1 −1 −1 −1 +1 +1 −1] being used for a second STS,
    a third candidate pilot sequence of [−1 +1 +1 −1 −1 −1 −1 −1 +1 +1 −1 +1] being used for a third STS,
    a fourth candidate pilot sequence of [+1 +1 −1 −1 −1 −1 −1 +1 +1 −1 +1 −1] being used for a fourth STS,
    a fifth candidate pilot sequence of [+1 −1 −1 −1 +1 −1 −1 +1 −1 +1 −1 +1] being used for a fifth STS,
    a sixth candidate pilot sequence of [−1 −1 +1 −1 −1 −1 +1 +1 −1 −1 +1 +1] being used for a sixth STS, a seventh candidate pilot sequence of [−1 −1 −1 +1 −1 +1 −1 +1 +1 +1 +1 +1] being used for a seventh STS, and
an eighth candidate pilot sequence of [−1 −1 −1 −1 +1 −1 +1 −1 +1 +1 +1 −1] being used for an eighth STS.

* * * * *